F. E. BRIGHT.
ANTIFRICTION BEARING.
APPLICATION FILED MAY 21, 1914.
1,215,474.
Patented Feb. 13, 1917.
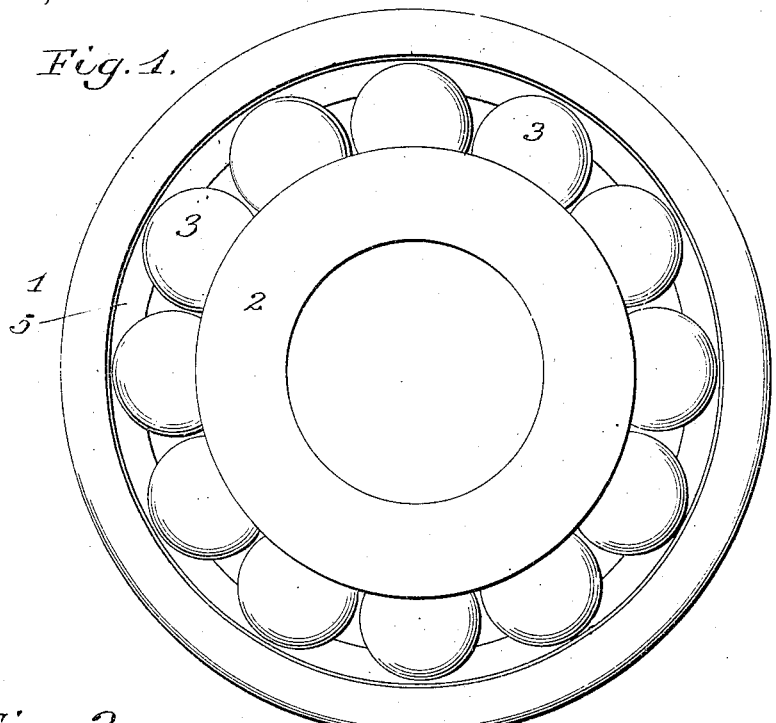
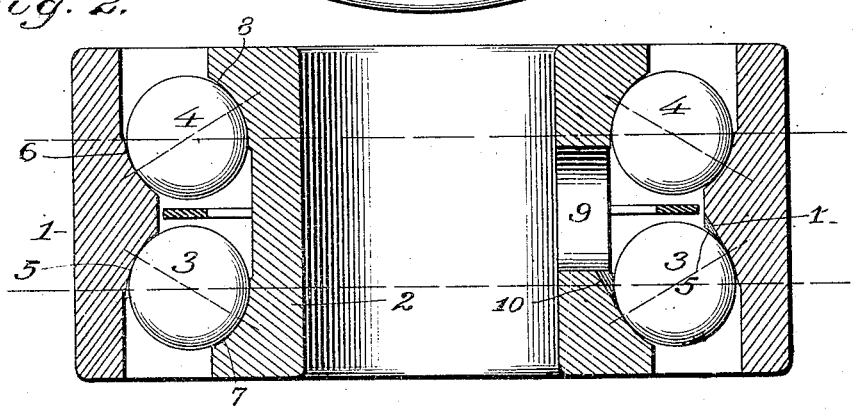
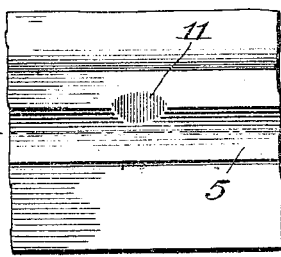
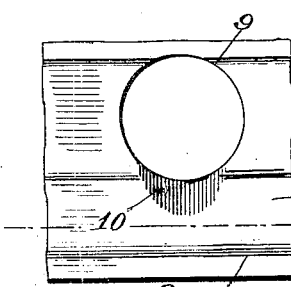
Witnesses:
M. R. Manning
E. J. Hotchkiss
Inventor
F. E. Bright
By his Attorneys
Rogers, Kennedy & Campbell

UNITED STATES PATENT OFFICE.

FRED E. BRIGHT, OF PHILADELPHIA, PENNSYLVANIA, ASSIGNOR TO THE HESS-BRIGHT MANUFACTURING COMPANY, A CORPORATION OF DELAWARE.

ANTIFRICTION-BEARING.

1,215,474.  Specification of Letters Patent.  Patented Feb. 13, 1917.

Application filed May 21, 1914. Serial No. 839,949.

*To all whom it may concern:*

Be it known that I, FRED E. BRIGHT, a citizen of the United States, residing at Philadelphia, in the county of Philadelphia and State of Pennsylvania, have invented certain new and useful Improvements in Antifriction-Bearings, of which the following is a specification, reference being had therein to the accompanying drawing.

This invention has reference to antifriction bearings of the type in which two series of annularly disposed balls are arranged in raceways between inner and outer casing elements in such manner that the load sustained by the bearing will be distributed between the said series of balls.

A bearing of this type is disclosed in Letters Patent of the United States, No. 1,071,693 issued to me on the 2nd day of September, 1913, the two raceways for the respective series of balls being in this patent, formed each by a flat surface on the inner side of the outer casing element, and an opposed groove on the outer side of the inner casing element, the balls being introduced through a filling opening extending through the inner casing element and situated between the two raceways. In order to preserve the continuity of the ball tracks in the raceways, non full-depth filling notches were provided leading from the opposite sides of the filling opening, which notches terminated inward of the effective lines of contact of the balls, so that the introduction of the balls into the raceway was effected by subjecting the balls to sufficient forcible pressure to spring them into place.

The present invention is an improvement on the patented construction, the object being to increase the carrying or load capacity of the bearing, and this I effect in accordance with the present invention by substituting a grooved surface for the flat surface of the patented construction, so that the raceway for a series of balls will be formed by opposing grooves in the respective casing elements, whereby the load carrying capacity of the bearing and its capability of receiving thrust loads are greatly increased. In order to preserve the continuity of the ball tracks as before, filling notches are formed in the inner sides of the opposing grooves, these filling notches being non full-depth, that is they do not extend quite to the bottom of the grooves where the balls have their effective line of contact. Consequently some pressure will be required to force or spring the balls through the filling notches into the raceway. One of the casing elements, in the form of the invention shown in the drawings, the inner one, is provided with a filling opening situated between the two raceways, the inner edge of which filling opening joins or merges into the filling notch in said casing element, the result being that the balls may be successively passed through the filling opening and forced laterally through the filling notches into their raceway, and when assembled therein, the balls will serve to maintain the parts of the bearing in proper operative relations, and will be prevented from escaping therefrom, thereby producing a unit-handling bearing.

In the accompanying drawing:

Figure 1 is a side elevation of a ball bearing having my invention embodied therein;

Fig. 2 is a longitudinal sectional elevation of the same;

Fig. 3 is a development of a portion of the inner side of the outer casing element showing the filling notch therein; and Fig. 4 is a similar view of the outer side of the inner casing element showing the filling opening and adjoining filling notch.

Referring to the drawings:

My improved bearing comprises an outer casing element 1, an inner casing element 2 arranged concentrically therein, and two series of antifriction balls 3 and 4 adapted to travel in the two raceways between said casing elements. The outer casing element is provided in its inner side with two grooves 5 and 6, and the inner casing element is provided in its outer side with two grooves 7 and 8, the grooves 5 and 7 being opposed to each other and constituting a raceway for the balls 3, and the grooves 6 and 8 being likewise opposed to each other and constituting a raceway for the balls 4, which series of balls in the operation of the bearing, travel around in said raceways and will have an effective bearing surface or track on single lines of contact on the respective grooves. 9 represents a filling opening for the balls, which in the present instance extends radially through the inner casing element, and is situated between the two raceways. The outer end of this filling opening communicates at one side with a non full-depth filling notch 10 formed in the inner casing element 2 and extending laterally through the inner edge of the groove 7 and terminating a slight distance inward of the ball track on said groove, the result being that the surface of the groove at this point extends slightly inward of the ball track and slightly overhangs the same. The opposing groove of the outer casing element 1 is likewise formed with a non full-depth filling notch 11, which cuts through the inner edge of the groove 5 and terminates a slight distance inward of the ball track on said groove, thereby leaving an intact portion of the groove at this point, extending slightly inward of and overhanging the ball track. As a result of this construction the balls may be introduced into the raceway, after the two casing elements have been adjusted circumferentially to bring the filling notches in opposition to each other, by passing the balls in succession through the radial filling opening and into the filling notches and applying moderate pressure to the balls, whereby they will be forced through the filling notches and over the intact portions of the grooves, and will spring into the raceway.

In the assemblage of the bearing, one of the series of balls 4 may be introduced into its raceway in different ways. For instance the casing elements may be displaced relatively in an axial direction to a sufficient extent to enable the balls to be assembled on one of the casing elements, after which the parts may be restored to their former operative concentric relations; or this series of balls may, after the casing elements have been displaced axially, be passed in succession through the filling opening 9, and when all are in place, the casing elements may be restored to their former operative relations. After the series 4 of balls have been inserted in place, the other series 3 are introduced through the filling notches in the manner hereinbefore described, that is, each ball is passed in succession through the filling opening, after the filling notches have been properly alined, and the balls are then forced through the filling notches and sprung into their raceway.

As a result of the construction described it is possible to employ casing elements which are each integral throughout and have ball tracks continuous and uninterrupted throughout their extent, the parts of the assembled bearing being held together by the balls in the form of a unitary structure.

In disassembling the bearing the foregoing assembling operations are reversed, the balls of the second series being first forced by slight pressure outward through the filling notches and then outward through the filling opening, and when all have been removed, the casing elements are displaced axially to permit the removal of the other series.

It will be observed that the two grooves in the outer casing element are inclined outwardly from the center of the ring, and that the two grooves in the inner casing element are disposed at a corresponding inclination, so that each raceway is formed of opposing grooves inclined outwardly and from the radial filling opening 9 in the inner ring. By reason of this relative form of the raceways, the tendency of the load sustained by the bearing is to maintain the two series of balls outwardly beyond the edges of the filling notches and the filling opening so that there will be no liability of the balls contacting with the notches or of their accidental escape through the filling opening.

While in the accompanying drawings I have illustrated my improved bearing in the form which I prefer to adopt and which in practice has been found to answer to an admirable degree the objects to be attained, it is understood that the same is susceptible of various modifications which will suggest themselves to the skilled mechanic without departing from the limits of the invention and further it will be understood that the invention is not limited to any specific form or arrangement of the parts except in so far as such limitations are specified in the claims.

It is to be observed that in my improved construction, the non-full-depth filling notches 10 and 11 coöperate with each other in admitting the balls to the inner side of their raceway, and that these coöperating notches are disposed wholly inward of the ends of the casing elements. I believe myself to be the first, in a two-row bearing, to employ coöperating non-full-depth filling notches in connection with a raceway consisting of opposed grooves, the said filling notches being formed in the inner sides of the said grooves so as to admit the balls into the inner side of the raceway, and said coöperating notches being disposed and contained wholly inward of the ends of the casing elements. This construction is to be distinguished from such constructions as are set forth in my United States Patents, Nos. 1,072,080 and 1,071,693 in that in these prior patents, the raceway is not composed of opposing grooves, and in that in these prior patents, there is not present, coöperating non-full-depth filling notches. My improved construction is to be distinguished also from the Blin Patent 818,374 and the Witte Patent 900,634, in that in these prior patents, the coöperating filling notches do not admit the balls to the inner side of the raceway, and said notches are not disposed therefore wholly inward of the ends of the casing elements, but rather they cut into said ends.

Having thus described my invention, what I claim is:

1. A ball bearing comprising inner and outer casing elements having two raceways between them for two series of balls, one of which raceways is formed by an external groove in the inner casing element and an opposing internal groove in the outer casing element, the said inner casing element being provided with a non-full-depth filling notch in the inner side of the groove therein, and the said outer casing element being provided with a non-full-depth filling notch in the inner side of its internal groove, said two filling notches being adapted to coöperate with each other in admitting balls to the raceway, and one of the casing elements being provided with a filling opening therethrough leading to the filling notch therein, the opposing grooves constituting said raceways being so formed and disposed that the load on the bearing will act to urge the two series of balls from the filling opening.

2. A ball bearing comprising inner and outer casing elements having two raceways between them for two series of balls, which raceways are formed by two grooves in the inner side of the outer casing element inclined outwardly in opposite directions from each other, and two grooves in the outer side of the inner casing element also inclined outwardly in opposite directions from each other and disposed opposite the other grooves, the grooves of one of said raceways being formed at their inner sides with non-full-depth coöperating filling notches to admit the balls to said raceway, and said inner casing element being provided between the grooves therein with a filling opening extending through the casing element and leading to the filling notches; whereby the load on the bearing will act to urge the two series of balls outwardly and away from the filling opening.

In testimony whereof, I have affixed my signature in presence of two witnesses.

FRED E. BRIGHT.

Witnesses:
C. R. M'CALLA,
C. S. BUTLER.